United States Patent
Storm et al.

(10) Patent No.: US 7,061,966 B2
(45) Date of Patent: Jun. 13, 2006

(54) FRAME SYNCHRONIZATION AND SCRAMBLING CODE INDENTIFICATION IN WIRELESS COMMUNICATIONS SYSTEMS AND METHODS THEREFOR

(75) Inventors: Brian Storm, Round Lake Beach, IL (US); Qiang Guo, Vernon Hills, IL (US); Ming D. Tan, Gurnee, IL (US); Xuping Zhou, Gurnee, IL (US); Mang Zhu, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 274 days.

(21) Appl. No.: 10/376,191

(22) Filed: Feb. 27, 2003

(65) Prior Publication Data

US 2004/0170221 A1   Sep. 2, 2004

(51) Int. Cl.
*H04L 27/30* (2006.01)
(52) U.S. Cl. .............. 375/145; 375/149; 375/366; 375/367; 370/512; 370/514; 370/515
(58) Field of Classification Search ............. 375/142, 375/145, 149, 150, 343, 364–367; 370/503, 370/506, 509, 512, 514, 515
See application file for complete search history.

(56) References Cited

U.S. PATENT DOCUMENTS

| | | | | |
|---|---|---|---|---|
| 5,987,059 A * | 11/1999 | Harrison et al. | ............ | 375/150 |
| 5,991,330 A * | 11/1999 | Dahlman et al. | ........... | 375/149 |
| 6,144,649 A | 11/2000 | Storm et al. | | |
| 6,480,558 B1 * | 11/2002 | Ottosson et al. | ............ | 375/350 |
| 6,571,099 B1 * | 5/2003 | Kim et al. | .................. | 455/442 |
| 6,744,747 B1 * | 6/2004 | Shiu et al. | .................. | 370/331 |

\* cited by examiner

*Primary Examiner*—Dac V. Ha
(74) *Attorney, Agent, or Firm*—Roland K. Bowler, II

(57) ABSTRACT

A mobile wireless communications device and methods therefore, including receiving a signal (710), storing a portion of the received signal (730), identifying all possible pilot signals by determining slot boundary information for the stored signal portion (720), determining frame boundary information and/or scrambling code information (760) of the stored signal portion by correlating the stored signal portion with the scrambling codes based on the slot boundary information. In other embodiments, the search is performed in real-time without storing the signal.

22 Claims, 4 Drawing Sheets

FRAME SYNCHRONIZATION AND SCRAMBLING CODE INDENTIFICATION IN WIRELESS COMMUNICATIONS SYSTEMS AND METHODS THEREFOR

FIELD OF THE DISCLOSURE

The present disclosure relates generally to wireless communications, and more particularly to frame synchronization and scrambling code determination in code division multiple access (CDMA) communication systems, for example, in $3^{rd}$ Generation (3G) Universal Mobile Telecommunications System (UMTS) communications systems, including mobile wireless communications devices and methods therefor.

BACKGROUND OF THE DISCLOSURE

In 3G UMTS communication systems, significant time is required for mobile stations, or subscriber devices, to search for neighbor pilot signals from neighbor list information provided by network base stations in a system information broadcast or similar message.

Presently, when searching for neighbor pilot signals, UMTS frame synchronization and scrambling code identification procedures are performed at separate signal processing stages, which generally require operation of the radio frequency (RF) receiver for extended time periods, including operation during standby mode, which represents more than an insubstantial drain on the battery.

At Stage 1 signal processing, slot boundaries of the primary synchronization channel (PSCH) of received neighbor signals are determined. Subsequently, at the Stage 2 processing, frame synchronization is performed by correlating several slots of the secondary synchronization channel (SSCH) with each of 16 secondary synchronization codes (SSC), thus permitting frame boundary determination and Group Code identification, from which a corresponding set of scrambling codes may be determined. In theory, assuming no noise or fading, frame synchronization requires correlation over at least 3 slots, but in practice the correlation may occur over 15 or more slots. Frame synchronization must be performed for each slot boundary identified at Stage 1 processing. At Stage 3 processing, base station selection occurs based upon the scrambling codes identified in Stage 2.

The existing frame synchronization procedure produces many false results and has a low detection probability, partly because the SSCH channel is a weak signal. Also, since the SSCH channel may be correlated only for 256 chips per slot, correlation over multiple slots is usually required, thus prolonging the time during which the RF receiver must operate. The existing frame synchronization process is thus relatively inefficient, particularly during standby mode operation when the RF receiver would otherwise be inoperative.

The various aspects, features and advantages of the disclosure will become more fully apparent to those having ordinary skill in the art upon careful consideration of the following Detailed Description of the Disclosure and the accompanying drawings described below.

DETAILED DESCRIPTION

The disclosure pertains generally to methods for frame synchronization and scrambling code identification in mobile wireless communications devices operating in spread spectrum communications systems, for example, in mobile subscriber devices communicating in CDMA communications networks.

Figure 1:
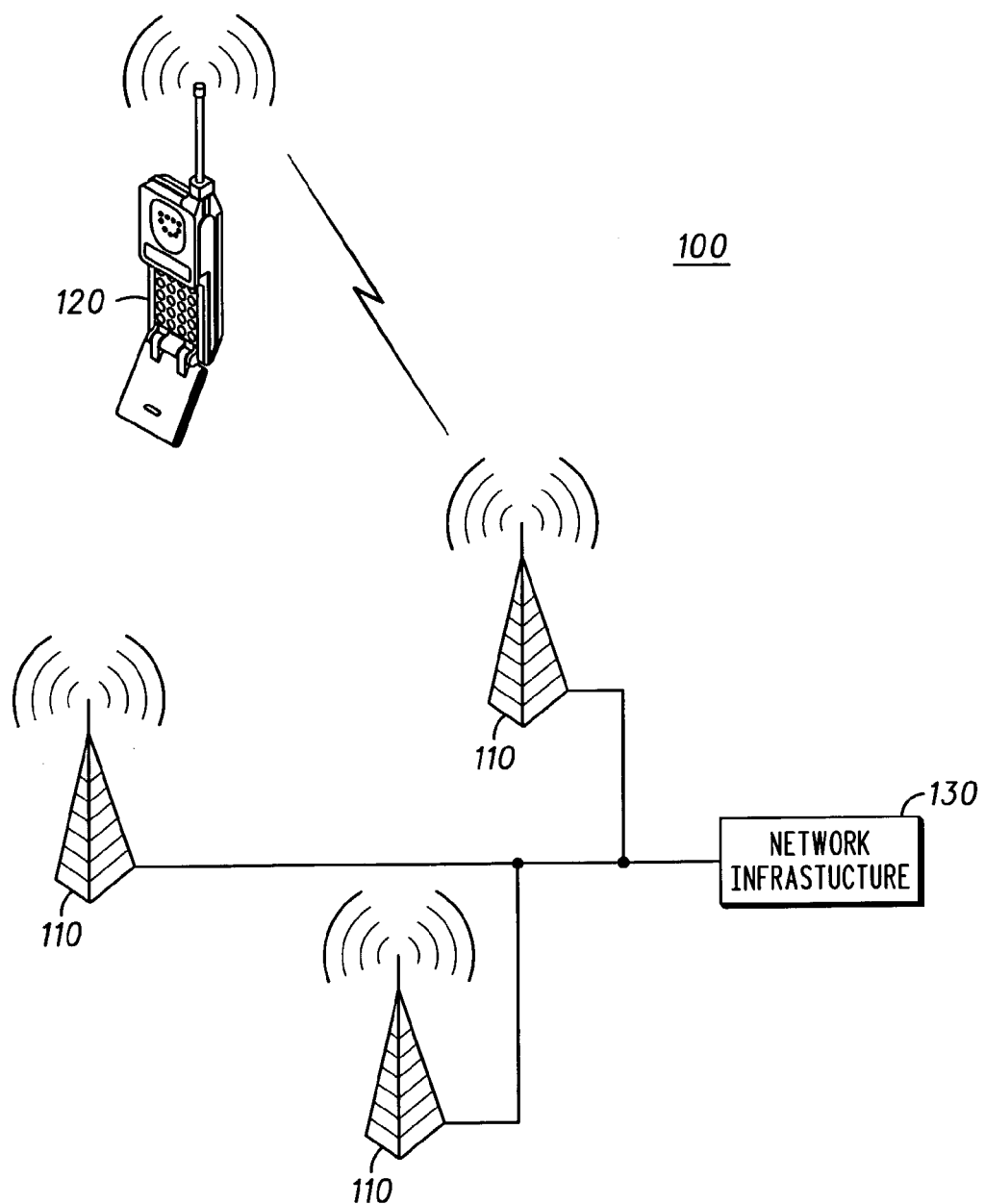
FIG. 1 is an exemplary communications system, including network infrastructure and a subscriber device.

FIG. 1 illustrates a wireless communications system 100 including a CDMA cellular communications network, for example, a $3^{rd}$ Generation (3G) Universal Mobile Telecommunications System (UMTS) communications system. The network generally comprises a plurality of base station transceivers 110 having corresponding overlapping cellular areas for supporting communications of mobile wireless communications subscriber devices, or user equipment (UE), 120 in the network. The communications network also includes other network infrastructure, known by those of ordinary skill in the art, indicated schematically in FIG. 1 at block 130.

In FIG. 1, mobile subscriber devices, for example, UE 120, in the communications network receive pilot and synchronization channel information from each of the neighboring base station transceivers 110. Each base station has a unique pilot signal, which may be distinguished from other pilot signals by its scrambling code, for example, a long scrambling code. The subscriber device must generally identify the neighboring base station pilot signals, which are used by the subscriber device to identify the presence of the network, for system acquisition, for demodulation of the synchronization, paging and traffic channels, and for hand-offs.

The disclosure generally concerns methods for determining frame boundary information and/or identifying a long scrambling code associated with a particular cell. These and other aspects of the disclosure are discussed more fully below.

Spread spectrum based subscriber devices, for example, UMTS UE, are generally capable of generating scrambling code information, or the scrambling code information is stored thereon, for frame synchronization, as is known generally by those of ordinary skill in the art. The scrambling code information corresponds, for example, to long scrambling codes associated with corresponding neighboring cells. In UMTS networks, subscriber devices are provided with neighbor cell information in a list provided in a System Information Block (SIB) of a Broadcast Channel (BCH).

In some networks, operators optionally provide Reference Time Difference (RTD) information between the Common Pilot Channels (CPICH) of neighboring cells and the serving cell. This information may be provided, for example, in the System Information Block of a Broadcast Channel in UMTS communications networks. The (RTD) information may be useful for extending the battery life of subscriber devices.

Thus generally during frame synchronization, frame timing information may or may not be known by the subscriber device.

Figure 2:
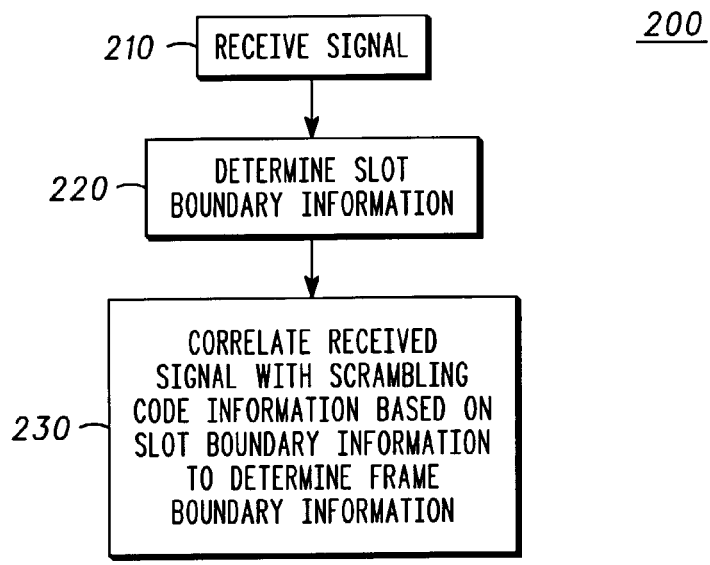
FIG. 2 is an exemplary frame synchronization process flow diagram.
Figure 3:
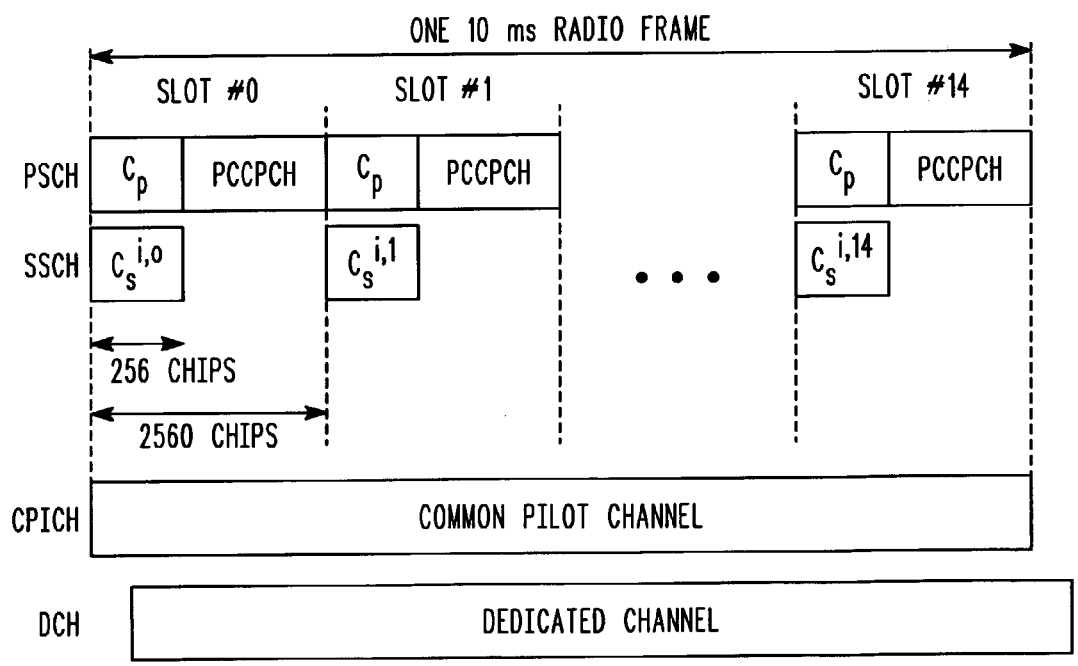
FIG. 3 illustrates radio frame and access slot timing of radio downlink physical channels.

FIG. 2 is an exemplary process flow diagram 200 for neighbor cell frame synchronization by a subscriber device. In FIG. 2, at block 210, the subscriber device receives signals from neighboring base stations. FIG. 3 illustrates exemplary radio frame timing and exemplary access slot timing information of downlink physical channels transmitted from exemplary UMTS network base stations. The UMTS signal has a 10 ms frame structure. Each frame comprises 15 slots, indicated as Slot 0–Slot 14 in FIG. 3. The exemplary UMTS signal includes a Primary Synchronization Channel (PSCH), a Secondary Synchronization Channel (SSCH), a Common Pilot Channel (CPICH), and a Dedicated Channel (DCH), all of which are illustrated schematically in FIG. 3.

Figure 4:
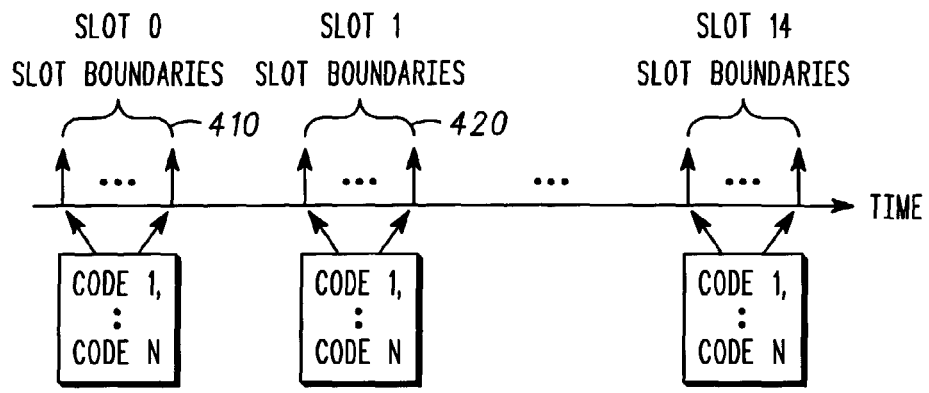
FIG. 4 is a schematic illustration of slot boundary and the scrambling code information.

In FIG. 2, at block 220, the subscriber device determines slot boundary information of the signal received. The slot boundary information generally includes the identification of at least one slot boundary, but more generally multiple slot boundaries are identified. The slot boundary information is essentially timing information. Each neighbor cell generally has a corresponding slot boundary, although multi-path effects may produce multiple slot boundaries for a particular cell. Slot boundary information for other neighbor cells may not be present because the corresponding signal strength is below a specified threshold. In one mode of operation, slot boundary information is determined from a Primary Synchronization Channel (PSCH) of received neighbor cell signals, for example, by conventional Stage 1 signal processing. FIG. 4 illustrates slot boundaries identified in Stage 1 signal processing. At least one and generally several slot boundaries are identified for each slot. In FIG. 4, groupings of slot boundaries for each slot are identified as 410, 420, . . . etc. for Slot 0, Slot 1 . . . Slot 14, respectively. Generally the signal amplitude corresponding to the slot boundaries varies, depending on signal strength, and only those having amplitudes above a specified threshold are considered for frame boundary and/or scrambling code determination. In FIG. 4, each slot boundary corresponds generally to a neighbor cell and has a corresponding time offset based on its position along the time axis.

Figure 5:
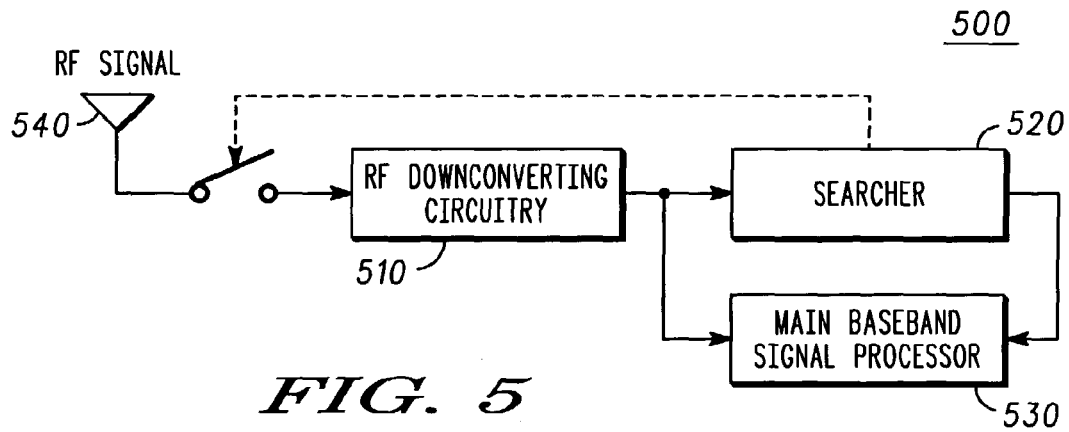
FIG. 5 is a partial schematic block diagram of radio RF receiver and signal processing circuits.
Figure 6:
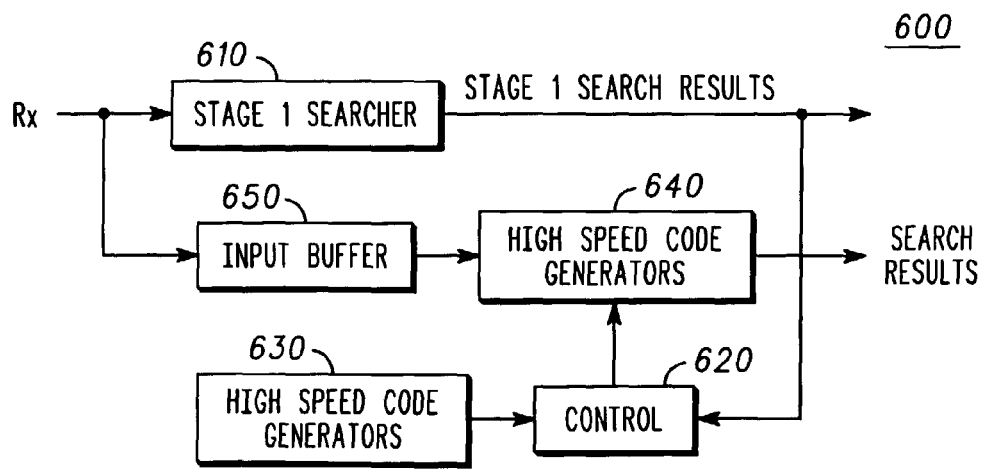
FIG. 6 is a partial schematic block diagram of a signal searcher.

FIG. 5 is a partial schematic block diagram of mobile communications device RF receiver and signal processing circuits 500 comprising generally radio down-converting circuitry 510 for providing basband signals to a searcher 520 and to a baseband processor 530. The down-converting circuitry is coupled to an antenna 540 by filtering and analog to digital converter circuits, which are known generally but not illustrated. FIG. 6 is a schematic block diagram of an exemplary searcher circuit 600 comprising generally a Stage 1 searcher 610 for performing Stage 1 signal processing as discussed above.

In FIG. 2, at block 230, frame boundary information and or a particular scrambling code is determined by correlating the signal with the scrambling code information based on the slot boundary information determined at block 220. The particular scrambling code is, for example, that associated with a particular corresponding cell.

The correlation process occurs by aligning scrambling code information relative to the received signal based upon the slot boundary information before correlating the signal and the scrambling codes. More particularly, the slot boundary information includes time-offset information, which is used to align the scrambling codes relative to the received signal, or portion thereof, for the correlation process, as discussed more fully below. For each slot boundary, correlation between the received signal and a scrambling code is performed at each of the several possible frame boundaries.

FIG. 4 is a schematic illustration of an exemplary correlation process. For each slot boundary, neighbor cell scrambling codes, Codes 1–N, are each aligned and correlated with the received signal, at each of the several possible frame boundaries, to determine the desired frame boundary information and/or to identify a particular scrambling code. In FIG. 4, for each slot boundary, correlation between the received signal and a scrambling code is performed at each of fifteen (15) possible frame boundaries. It is unnecessary to use or first determine frame boundary information and/or scrambling group code information prior to determining the scrambling codes. The correlation process yields the frame boundary information and particular scrambling code information substantially simultaneously.

In FIG. 6, the Stage 1 searcher provides the slot boundary information determined during the Stage 1 processing to a controller 620. The controller provides scrambling code information, for example, long scrambling codes, generated by a code generator 630 to a correlator circuit 640 based on the slot boundary information determined by the Stage 1 searcher, as discussed above. The correlator circuit 640 determines the frame boundary information and/or scrambling code information by correlating the received signal and the scrambling codes, as discussed above. As noted, scrambling codes may be identified without using frame boundary information or scrambling code group information.

In one embodiment, the scrambling code information is correlated with a continuous signal. In the exemplary UMTS embodiment, the scrambling code information is correlated with the Common Pilot Channel (CPICH) illustrated in FIG. 3, although other signals may be used in other embodiments.

In some modes of operation, the subscriber device stores a portion of the received signal, for example, a portion of the Common Pilot Channel (CPICH), and then de-energizes the RF receiver, whereupon the correlation is performed using the stored signal portion without continuing operation of the radio receiver.

FIG. 6 illustrates an input buffer 650 for storing the received signal portion, which is provided to the correlator circuit for correlation with the scrambling codes. In the schematic illustration of FIG. 5, the RF receiver is disabled upon actuation of a switch by the searcher 520 upon receipt and storage of the signal portion in a buffer. In FIG. 6, the controller 620 de-energizes the RF receiver circuits.

In some embodiments, information for less than one complete frame, for example, less than one of the 10 ms frames of the exemplary UMTS signal illustrated in FIG. 3, is stored in the buffer. In one embodiment, information for a single slot or not substantially more than a single slot of a frame is stored in the buffer. In other embodiments, the stored portion of the received signal includes page indication information for the subscriber device searching the pilot signals.

Figure 7:
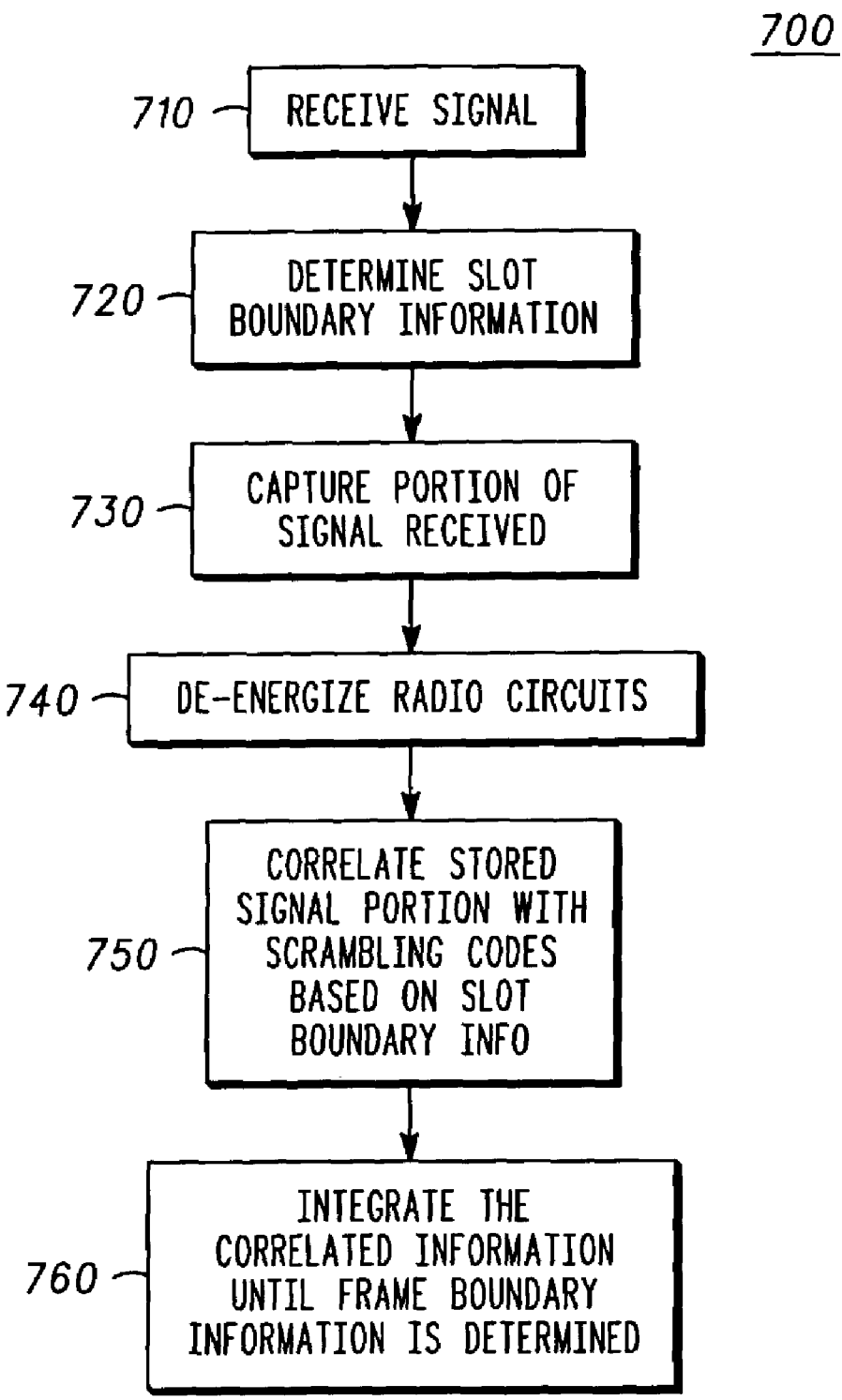
FIG. 7 is an alternative frame synchronization process flow diagram.

In the frame synchronization process flow diagram 700 of FIG. 7, the signal is received at block 710 and Stage 1 slot boundary information is determined at block 720. At block 730, a portion of the received signal, for example, the continuous Common Pilot Channel (CPICH) signal is captured in memory for subsequent correlation with the scrambling codes. In some embodiments, less than one complete frame of information is stored in the buffer, and in other embodiments information for a single slot is stored in the buffer. The slot boundary information may be obtained from the stored signal portion, though in other embodiments determination of the slot boundaries during Stage 1 processing occurs prior to storage of the signal portion or partially concurrently with the signal storage operation.

In some embodiments, the stored portion of the signal includes paging information for the subscriber device, thereby eliminating the need to re-energize the receiver to obtain page indicator information.

At block 740, in some embodiments, after storing the received signal portion, the radio circuits are de-energized, thus reducing unnecessary power consumption associated with operation of the RF receiver during the correlation process. Determination of the frame boundary information and/or particular scrambling code information is performed by correlating the stored signal portion with the scrambling codes at block 750, as discussed above, while the radio circuit is deenergized.

If after determination of the slot boundary information during conventional Stage 1 signal processing, signal information for not substantially more than a single slot is captured or stored in the buffer, the radio circuit power ON time can be reduced from on the order of 10 ms (required for conventional Stage 2 and Stage 3 processing) to less than 1 ms, when using the synchronization process described above, substantially reducing charge drawn from the battery.

In FIG. 7, at block 760, for each correlation, the correlated information is preferably integrated as long as is required to determine the frame boundary and/or scrambling code information. In the exemplary UMTS synchronization application, the correlation of the common pilot channel, CPICH, with the scrambling codes permits the integration.

While the present disclosure and what are considered presently to be the best modes of the inventions have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a wireless communications device, the method comprising:
   receiving a signal;
   determining slot boundary information of the signal;
   determining frame boundary information of the signal by correlating the signal with several scrambling codes based upon the slot boundary information,
   identifying a particular scrambling code at the same time the frame boundary information is determined.

2. The method of claim 1, correlating the signal with the scrambling codes based upon the slot boundary information includes aligning the scrambling codes relative to the signal based upon the slot boundary information before correlating the signal with the scrambling codes.

3. The method of claim 2, correlating the signal with the scrambling codes at each of several possible frame boundaries.

4. The method of claim 1, the signal is a continuous signal, correlating the continuous signal with each of the scrambling codes.

5. The method of claim 1, the signal is a common pilot channel, correlating the common pilot channel with each of the scrambling codes.

6. The method of claim 1,
   the slot boundary information includes time offset information;
   correlating the signal with the scrambling codes based on the time offset information.

7. The method of claim 1, for each correlation, integrating as long as is required to determine the frame boundary information.

8. A method in a wireless communications device, the method comprising:
   receiving a signal;
   storing a portion of the signal;
   determining slot boundary information of the stored signal portion;
   determining frame boundary information of the stored signal portion by correlating the stored signal portion with a plurality of scrambling codes based on the slot boundary information;
   identifying a particular scrambling code at the same time the frame boundary information is determined.

9. The method of claim 8,
   determining slot boundary information includes identifying a plurality of slot boundaries,
   correlating the stored signal portion with the plurality of scrambling codes at each of the plurality of slot boundaries.

10. The method of claim 8, the signal is structured by frames, storing the portion of the signal by storing less than a complete frame.

11. The method of claim 8, correlating the signal with the scrambling codes based upon the slot boundary information includes aligning the scrambling codes relative to the signal based upon the slot boundary information before correlating the signal with the scrambling codes.

12. The method of claim 8, the signal is a continuous signal, correlating the continuous signal with each of the scrambling codes.

13. The method of claim 8, the signal is a common pilot channel, correlating the common pilot channel with each of the scrambling codes.

14. The method of claim 8, de-energizing a radio receiver of the wireless communications device after storing the portion of the signal.

15. The method of claim 8, storing page indication information for the wireless communications device when storing the portion of the signal.

16. The method of claim 8, identifying the particular scrambling code by correlating the signal with the scrambling codes based upon the slot boundary information.

17. A method in a wireless communications device, the method comprising:
   receiving a signal;
   determining at least one slot boundary of the signal;
   identifying a particular scrambling code associated with the at least one slot boundary by correlating the signal with a plurality scrambling codes based on the at least one slot boundary without using scrambling code group information.

18. A method in a wireless communications device, the method comprising:
   receiving a signal;
   determining at least one slot boundary of the signal;
   identifying a particular scrambling code associated with the at least one slot boundary by correlating the signal with a plurality scrambling codes based on the at least one slot boundary without using frame boundary information.

19. The method of claim 18, determining a frame boundary information at the same time the particular scrambling code is identified.

20. The method of claim 18, for each correlation, integrating as long as is required to identify the particular scrambling code.

21. The method of claim 18,
storing a portion of the signal received;
identifying the particular scrambling code by correlating the stored signal portion with the plurality of scrambling codes based upon the at least one slot boundary without using frame boundary information.

22. The method of claim 21, de-energizing a radio receiver of the wireless communications device after storing the portion of the signal.

* * * * *